US006910526B1

(12) United States Patent
Sokolean

(10) Patent No.: US 6,910,526 B1
(45) Date of Patent: Jun. 28, 2005

(54) CONTACT ELEMENT AND CEILING ELEMENT FOR A HEATING AND COOLING CEILING

(75) Inventor: Helmuth Sokolean, Uerikon (CH)

(73) Assignee: Barcol-Air AG, Stäfa (CH)

( * ) Notice: Subject to any disclaimer, the term of this patent is extended or adjusted under 35 U.S.C. 154(b) by 691 days.

(21) Appl. No.: 08/710,554

(22) Filed: Sep. 19, 1996

(30) Foreign Application Priority Data

Oct. 6, 1995 (CH) .............................. 2822/95

(51) Int. Cl.⁷ .......................... F24D 19/02; F24D 5/10; F28F 3/12; F28F 1/12
(52) U.S. Cl. .................. 165/56; 165/171; 165/135; 165/168; 165/49; 62/451; 237/69
(58) Field of Search .............. 165/56, 171, 135, 165/136, 168, 169, 49; 62/451; 237/69

(56) References Cited

U.S. PATENT DOCUMENTS

| 1,800,150 A | * | 4/1931 | Musgrave et al. | .......... 165/136 |
| 2,004,857 A | * | 6/1935 | Deriaz | .......... 165/136 |
| 2,625,378 A | * | 7/1953 | Nason | .......... 165/169 |
| 2,668,666 A | * | 2/1954 | Anderson | .......... 165/56 |
| 2,805,842 A | * | 9/1957 | Andorfer | .......... 165/56 |

(Continued)

FOREIGN PATENT DOCUMENTS

| AT | 221758 | * | 6/1962 | .......... 165/168 |
| CH | 241602 | | 8/1946 | |
| CH | 639288 | * | 11/1983 | |
| DE | 2932284 | * | 2/1981 | .......... 165/56 |
| EP | 0057276 | * | 8/1982 | .......... 165/56 |
| EP | 0 406 476 | | 1/1991 | |
| GB | 2036840 | * | 7/1980 | |
| GB | 2183022 | * | 5/1987 | .......... 165/171 |
| JP | 0015163 | * | 2/1977 | .......... 165/136 |
| JP | 0022153 | * | 2/1977 | .......... 165/171 |
| JP | 0049641 | * | 4/1980 | .......... 165/49 |
| JP | 0165894 | * | 2/1981 | .......... 165/56 |
| JP | 56-160597 | * | 12/1981 | |
| JP | 58-145320 | * | 8/1983 | |
| JP | 0246598 | * | 11/1986 | .......... 165/171 |
| JP | 1-137126 | * | 11/1987 | |
| JP | 5-138654 | * | 6/1993 | |
| JP | 6-147724 | * | 5/1994 | |
| JP | 6-221587 | * | 8/1994 | .......... 237/69 |
| NL | 291742 | | 7/1965 | |
| WO | WO82/01058 | * | 4/1982 | .......... 165/56 |
| WO | WO 82/01058 | * | 4/1982 | .......... 165/56 |

OTHER PUBLICATIONS

Von Helmuth Sokolean, "Kühldeckentechnologie zur Erreichung des bestmöglichen Raumkomforts," Architektur und Technik, pp. 49–53.

*Primary Examiner*—John K Ford
(74) *Attorney, Agent, or Firm*—Finnegan, Henderson, Farabow, Garrett & Dunner, LLP

(57) ABSTRACT

In order to improve the heat-conducting connection between a contact element (3) and a ceiling panel (1) which are adhesively bonded to one another, the contact panel (5) of the contact element (3) is provided with an adhesive depression (10) in the contact surface (6), said depression taking up only part of said contact surface, while the remaining part of the latter rests directly against the upper side of the ceiling panel (1). The contact panel (5) may be elastically or plastically deformable, e.g. along a bending groove (9), with the result that it adapts more easily to irregularities, such as those caused, for example, by slight sagging of the ceiling panel (1). This permits larger widths of the contact panel (5) without impairing the thermal contact. In order to ensure close abutment of the parts of the contact surface (6) which are not adhesively bonded to the upper side of the ceiling panel (1), the contact panel (5) can be appropriately prestressed.

13 Claims, 3 Drawing Sheets

U.S. PATENT DOCUMENTS

| | | | | |
|---|---|---|---|---|
| 3,143,637 A | * | 8/1964 | Rifenbergh | 165/49 |
| 3,265,121 A | * | 8/1966 | Hickman | 165/136 |
| 3,366,170 A | * | 1/1968 | Welz | 165/171 |
| 3,883,135 A | * | 5/1975 | Milliken | 272/8 N |
| 4,080,703 A | * | 3/1978 | Beck, Jr. | 165/171 |
| 4,172,444 A | * | 10/1979 | Atkinson | 165/168 |
| 4,338,995 A | * | 7/1982 | Shelley | 165/171 |
| 4,589,338 A | * | 5/1986 | Collins et al. | 101/216 |
| 5,042,570 A | * | 8/1991 | Schmitt-Raiser et al. | 165/56 |
| 5,292,065 A | * | 3/1994 | Fiedrich | 165/168 |
| 5,454,428 A | * | 10/1995 | Pickard et al. | 165/49 |
| 5,743,330 A | * | 4/1998 | Bilotta et al. | 165/171 |
| 5,799,723 A | * | 9/1998 | Sokolean | 165/168 |

* cited by examiner

CONTACT ELEMENT AND CEILING ELEMENT FOR A HEATING AND COOLING CEILING

BACKGROUND OF THE INVENTION

1. Field of the Invention

The present invention relates to a contact element for providing heat transfer from a heat transfer medium to a ceiling and to a ceiling element which comprises such a contact element.

2. Description of the Related Art

Various configurations of contact and ceiling elements which can be used for heating ceilings and cooling ceilings and for ceilings which are intended for both heating and cooling are known. A number of such configurations are described in H. Sokolean: "Kühldeckentechnologie zur Erreichung des bestmöglichen Raumkomforts" [Cooling-ceiling technology for achieving the best possible interior conditions], Architektur und Technik 8/92, p. 49–53, B+L Verlags AG, Schlieren (Switzerland).

One of the basic problems of ceiling elements of the type mentioned here has been the task of always ensuring good heat transfer between a heat transfer medium, usually a liquid, which flows through the element, and the ceiling panel, which closes off the ceiling element from the room which is to be conditioned climatically. There are technically satisfactory solutions, such as those which emerge from the abovementioned article, for this problem. It is thus possible for a ceiling element, for example, to be extruded from aluminium in one piece with the ceiling panel and a guide which is arranged on the upper side of said element and into which a copper or steel pipe is passed as corrosion protection with respect to the liquid. However, this configuration involves a high degree of outlay and is correspondingly expensive.

Less expensive solutions are those in which the guide is part of a contact element which is produced separately from the ceiling panel, e.g. is extruded from aluminium or another corrosion-resistant material, and whose contact surface is adhesively bonded in its entirety to the ceiling panel. However, it has been found that, in the case of this intrinsically tried and tested solution, due to the low thermal conductivity of the adhesive, a marked jump in temperature occurs at the adhesive layer despite the low thickness of the same, and this jump in temperature considerably reduces the heating and cooling capacity. In the case of cooling in particular, a considerable proportion of the difference between the desired temperature of the climatically conditioned room and the temperature of the contact element, which has to lie above the dew point, is lost at this point.

SUMMARY OF THE INVENTION

The object of the invention is to specify contact elements and ceiling elements of the generic type which ensure better heat transfer to the ceiling panel. This object is achieved by the contact element as characterized in the claims and by the specified ceiling elements.

The advantages achieved by the invention being that the heat transfer between the contact element and the ceiling panel is considerably improved and consequently, better use can be made of the temperature difference between the room which is to be conditioned climatically and the contact element, the temperature difference being limited by the dew point.

In addition, the improvements permit an increase in the contact surface area which are possible because it has been found that, due to the poor thermal conductivity of the conventional ceiling panels, the heating and cooling of the panels remains confined essentially to those regions which are located directly beneath the contact element. For this reason, it is desirable to make the contact surface as large as possible. In the case of rigid contact elements, limitations arise due to irregularities of the ceiling panel, in particular due to the bending which is caused by the dead weight of the ceiling panel and the weight of other parts, such as the contact element, bearing on it. Thus, according to a particularly advantageous configuration of the invention, the contact panel is designed to be elastically or plastically deformable, with the result that it adapts to some extent to the ceiling panel, and even a large contact surface bears in its entirety thereon. In addition, such a design of the contact panel, in some circumstances, aids good heat-conducting contact between the ceiling panel and those parts of the contact surface which are not adhesively bonded to said ceiling panel.

It is to be understood that both the foregoing general description and the following detailed description are exemplary and explanatory only and are not restrictive of the invention, as claimed.

BRIEF DESCRIPTION OF THE DRAWINGS

The invention is explained in more detail hereinbelow with reference to figures, which merely illustrate exemplary embodiments and in which.

DESCRIPTION OF THE PREFERRED EMBODIMENTS

Figure 1A:
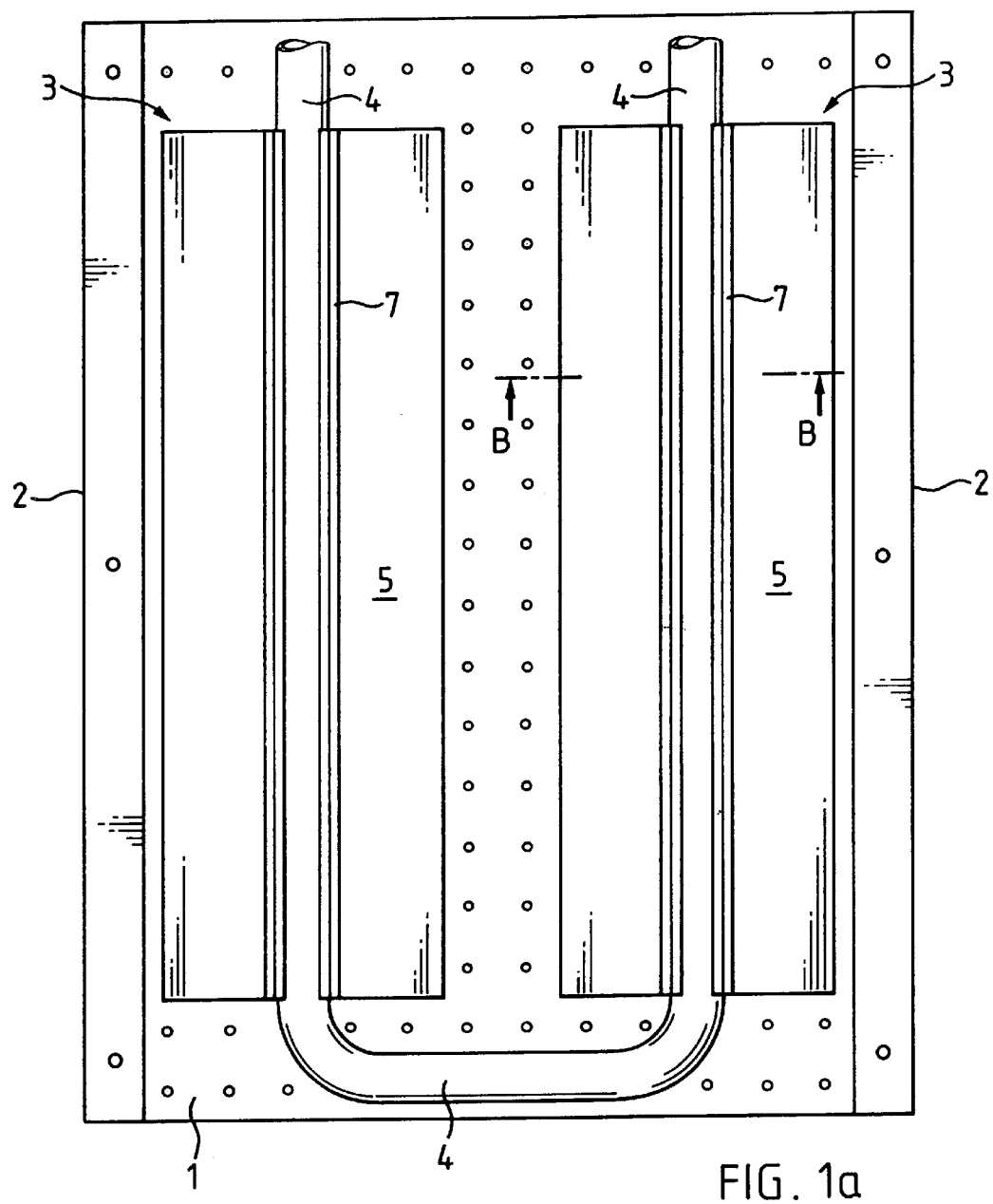
FIG. 1a shows a plan view of a first embodiment of a ceiling element according to the invention.
Figure 1B:
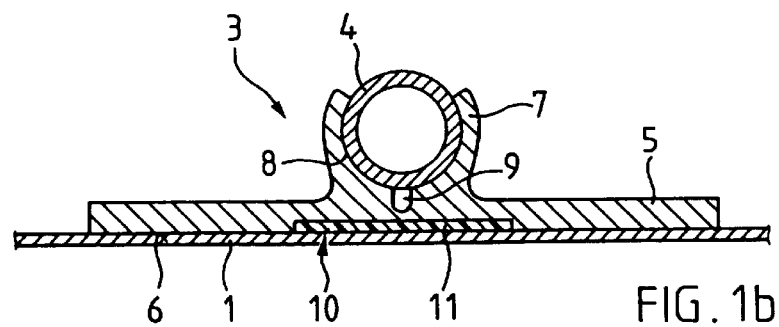
FIG. 1b shows, on an enlarged scale, a cross-section on B—B in FIG. 1a, FIG. 2 shows a cross-section through a second embodiment of a ceiling element according to the invention.

The ceiling element comprises in each case a ceiling panel 1 which is preferably, but not necessarily, perforated, and is formed of aluminium, preferably sheet aluminium, sheet steel, plastic, gypsum or wood ceiling panel 1 has side flanges 2 which serve for fastening the ceiling panel 1, for example, on the ceiling of a climatically conditioned room. In the first embodiment of the ceiling element (FIG. 1a, b), two contact elements 3 are arranged in parallel on the upper side of the ceiling panel 1 and have a U-shaped pipe 4 of copper, steel or plastic drawn through them.

The contact element 3 is made from a strong, preferably metallic material. In the first embodiment is preferably extruded from aluminium. It has a rectangular contact panel 5 whose underside forms an essentially planar contact surface 6, while a guide 7 is arranged on the upper side. Guide 7 forms an upwardly open channel 8 into which the pipe 4 is drawn or pressed. On the base of the channel 8 is a bending groove 9 which is continuous in the longitudinal direction, is of U-shaped cross-section and divides the contact panel 5 into two halves which are rigid, but can be pivoted slightly with respect to one another at the bending groove 9 with elastic deformation. bending groove 9 serves simultaneously as a venting channel. In its centre, the contact surface 6 has a strip-like adhesive depression 10 which is continuous in the longitudinal direction and is filled with an adhesive means, preferably an adhesive strip 11, which bonds adhesively on both producing a close mechanical connection between the contact surface 6 and the upper side of the ceiling panel 1. The adhesive depression 10 has a depth of approximately 0.1 mm to 0.2 mm and takes up approximately a third of the contact surface 6.

In order to produce the ceiling element, the adhesive strip 11 is applied to the base surface of the adhesive depression 10. In the embodiment shown, the strip is somewhat narrower than the adhesive depression, while its thickness slightly exceeds the depth of said depression. The contact surface 6 is then pressed against the upper side of the ceiling panel 1, the contact panel 5 and said ceiling panel 1 are heated in the process, and the contact element 3 is thus adhesively bonded to the ceiling panel 1. During this, the adhesive strip 11 is pressed out in width to some extent, with the result that it virtually completely fills the adhesive depression 10.

Along both sides of the adhesive depression 10, the contact surface 6 is in close direct contact with the upper side of the ceiling panel 1 without the heat flow being obstructed by an adhesive layer of low thermal conductivity located therebetween. In this arrangement, the two halves of the contact surface can adapt to the upper side of the ceiling panel 1 since they are not connected fully rigidly to one another and can be pivoted slightly along the bending groove 9. Each of the two halves intersects the adhesive depression 10, so that they are connected fixedly to the ceiling panel in an independent manner and good contact between the upper side of the ceiling panel 1 and those parts of the contact surface 6 which are not adhesively bonded is ensured. This can be aided by the contact panel 5 being prestressed, such that the two halves of said panel are inclined slightly with respect to one another prior to the adhesive bonding of the contact element 3 to the ceiling panel 1, i.e. the associated halves of the contact surface 6 enclose an angle which is slightly smaller than 180°.

Figure 2:
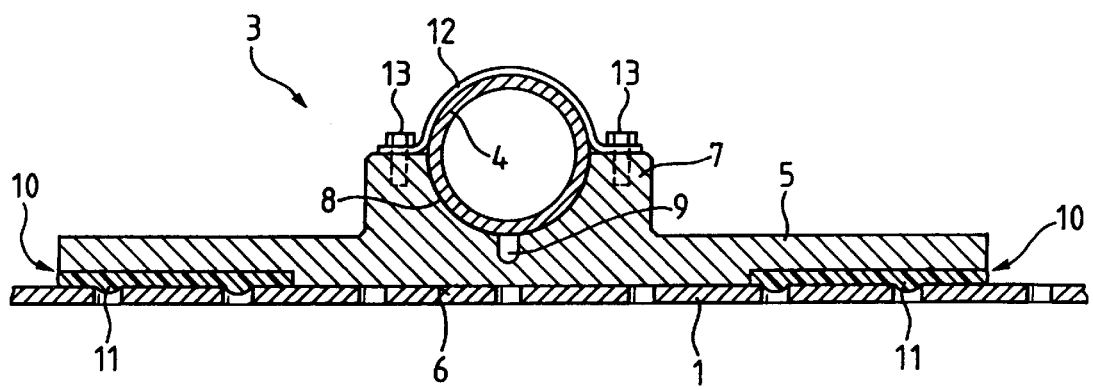

In a second embodiment (FIG. 2), of contact element 3, there are provided at the border 15 of the contact panel 5 two strip-like adhesive depressions 10, in which, once again, adhesive strips 11 are arranged and which, taken together, form an adhesive surface which takes up approximately half of the contact surface area 6. The contact panel 5 is, once again, divided by a continuous bending groove 9 into two rigid halves which can be pivoted slightly with respect to one another, each of the corresponding parts of the contact surface 6 comprising part of the adhesive surface. Here too, the pressing-on operation of that part of the contact surface 6, in this case the central part, which is not adhesively bonded to the upper side of the ceiling panel 1 can be aided by the contact panel 5 being prestressed. In this case, the angle enclosed by the two halves of the contact surface 6 prior to the adhesive bonding to the ceiling panel 1 has to be slightly greater than 180°.

Channel 8 encloses half of the pipe 4, with the result that, instead of having to be drawn or pressed in, the pipe can be fitted in position subsequently. It is secured in the channel 8, and pressed on, by elastic clamps 12 which are held down by bolts 13 anchored in the guide 7.

Figure 3A:
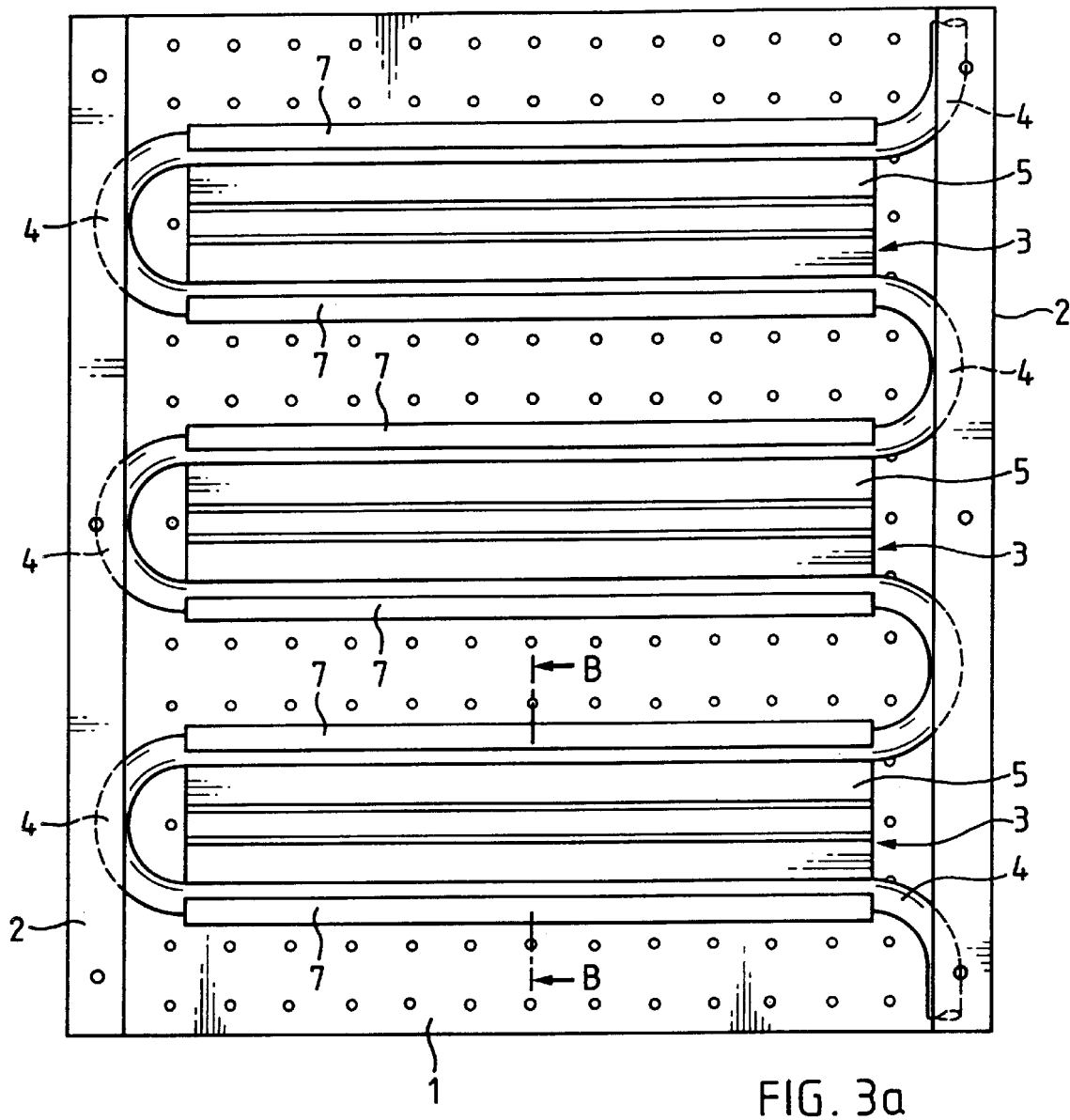
FIG. 3a shows a plan view of a third embodiment of a ceiling element according to the invention.
Figure 3B:
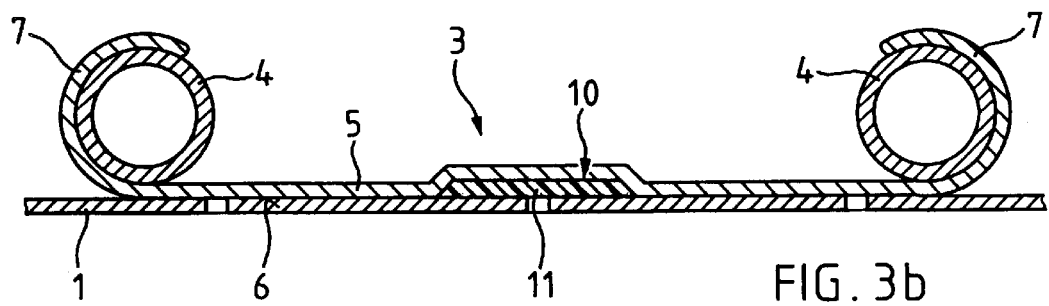
FIG. 3b shows, on an enlarged scale, a cross-section on B—B in FIG. 3a, and FIG. 4 shows a cross-section through a fourth embodiment of a ceiling element according to the invention.

In a third embodiment of the contact element (FIGS. 3a, b), three contact elements 3 are arranged on the upper side of the ceiling panel 1 and have the pipe 4 drawn through them in a meandering fashion, two parallel pipe sections being guided in each contact element 3.

The contact element 3 is produced in each case from a strip of sheet metal, which preferably consists of an elastic copper alloy, e.g. copper/beryllium, but may also consist of aluminium, and forms a contact panel 5 which is bent over at borders 15 to form guides 7 which enclose the pipe 4 on an outer side thereof. The guide 7 is designed in each case such that it encloses the pipe 4 on the outer half of the pipe and presses elastically on pipe 4. With slight outward bending of the guides 7, the pipe 4 can be pushed into guide 7. The guides 7 may also be designed such that they extend only slightly beyond half the height of the pipe 4, with the result that the pipes can be snap-fitted into the guides 7 from above.

The contact panel 5 has, in the centre, a flat indent which forms, in the contact surface area 6, a strip-like adhesive depression 10 which is continuous in the longitudinal direction and in which, once again, an adhesive strip 11 is provided. Here too, the contact panel 5 may be prestressed slightly and, prior to the adhesive bonding to the ceiling panel 1, may be somewhat concave in the downward direction, with the result that the lateral strips of the contact surface 6 which are not adhesively bonded to the ceiling panel 1 are pressed fixedly onto the upper side of the ceiling panel 1.

Figure 4:
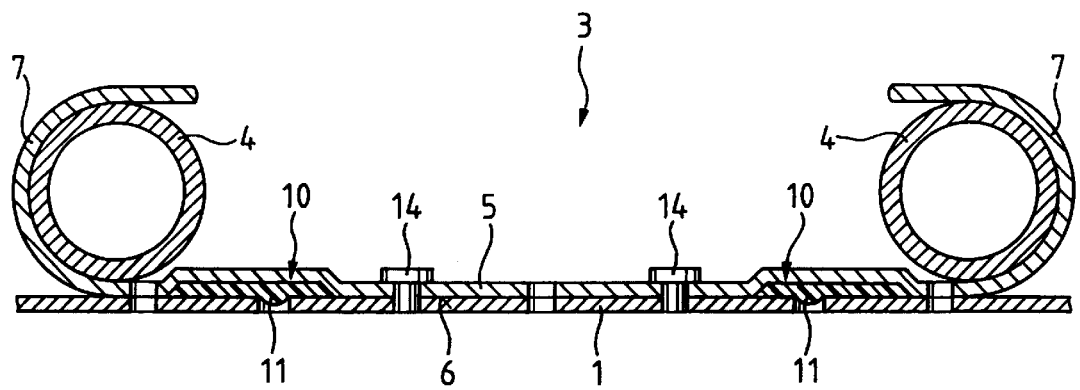

In a fourth embodiment of the contact element (FIG. 4), the contact element 3 is produced from sheet copper or sheet aluminium and, once again, has two guides 7 which are formed by the contact panel material being bent over at the borders 15 such that they may rest against the outer half of the pipe 4. The internal diameter of the guides 7 may be selected to be slightly smaller than the external diameter of the pipe 4, with the result that guides 7 are deformed slightly when the pipe is pushed in and thus good contact between the guide 7 and the pipe 4 is then ensured.

The contact panel 5 has two flat indents which form, in the border regions 17 of the contact surface 6, strip-like adhesive depressions 10 which are continuous in the longitudinal direction. The adhesive depressions 10 are relatively narrow, with the result that the entire adhesive surface area takes up considerably less than half of the contact surface area 6. Prior to the adhesive bonding to the ceiling panel 1, the contact panel 5 may be slightly convex in the downward direction in the centre, with the result that, as a result of the pressing-on operation during the adhesive bonding, it is deformed slightly—essentially plastically due to the low elasticity of the copper or aluminium—and the central strip of the contact surface 6, which is not adhesively bonded, will then rest closely against the upper side of the ceiling panel 1.

Additionally, the contact panel 5 has perforations 20 which are essentially congruent with those of the ceiling panel 1. In order that the holes 20 in the contact panel 5 coincide with those in the ceiling panel 1, positioning pins 14 are inserted into at least two holes 20 of the contact panel 5 and project beyond the contact surface 6. Prior to the adhesive bonding, the contact element 3 is positioned on the ceiling panel 1 such that the positioning pins engage in holes in the ceiling panel 1, which ensures that the rest of the holes also coincide. In this embodiment, it is possible to make the holes in the contact panel 5 somewhat larger than those in the ceiling panel 1, in order that relatively minor deviations in the hole positions or slight displacements do not pose any problems. After the adhesive bonding of the contact element 3 to the ceiling panel 1 by pressing under the action of heat, the positioning pins 14 can be removed. The noise-damping action of a dampening element such as an insulation mat, arranged above the contact element, is considerably improved by the congruent perforations.

In the embodiments outlined, the contact panels 5 are essentially rigid in the longitudinal direction and are deformable only in the transverse direction. This is sufficient if the ceiling panel is bent to a relatively pronounced extent in only one direction, with respect to which the contact elements 3 should then be aligned transversely. Slight bending in the longitudinal direction of the contact elements 3 is compensated by the contact elements themselves, i.e. the ceiling panel adapts to the rigid contact element 3 by way of the adhesive connections 10,11. However, in the case of a more pronounced tendency to bend in the longitudinal direction of the contact elements 3 the adhesive connections would be subject to excessive stress. Thus, in an alternative embodiment where the bending is comparatively pronounced in two directions, it is preferred to design the contact elements 3 such that they can also be deformed in two directions, i.e., the guides 7 are of an interrupted design and are divided into a number of sections and, if necessary, transversely running bending grooves are provided in addition. The pipe should then likewise be flexible, e.g. it should be designed as a plastic pipe or even replaced by a tube.

Of course, the adhesive depressions 10 may also be of an interrupted design and need not be continuous in the longitudinal direction. However, in order to ensure good heat transfer between the upper side of the ceiling panel 1 and the parts of the contact surface area 6 which are not adhesively bonded, the distance of the parts of the contact surface area from the adhesive surface should not be too great and should not exceed, for example, 100 mm.

Nevertheless, it is not absolutely necessary for the adhesive surfaces to adjoin directly the parts of the contact surface which are not adhesively bonded as is the case in the exemplary embodiments, even if this does permit a particularly compact and favourable construction of the contact element 3 with a compact contact panel 5 and continuous contact surface 6. The idea of the invention is, in the most general terms, that part of the contact surface 6 forms an adhesive surface which is adhesively bonded to the upper side of the ceiling panel 1, while another part, which does not necessarily have to adjoin the adhesive surface, is pressed against the ceiling panel 1 without an adhesive layer, which obstructs the heat conduction, located between the panel and contact surface, the adhesive connection serving as anchorage. This can be effected favourably by elastic deformation of the contact element 3, and also of the ceiling panel 1, it being possible for the elastic deformation to be constituted purely by residual stressing after essentially plastic defomation during the adhesive bonding.

Moreover, by virtue of the contact panel being designed so as to be deformable in the transverse direction, as has been outlined in conjunction with the four exemplary embodiments, it is possible to select the width of the contact surfaces to be greater than has been customary hitherto, e.g. 70 mm or more. This advantage is, of course, also provided if the contact surface does not have any adhesive depressions and the entire contact surface is adhesively bonded to the upper side of the ceiling panel.

Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. A contact element for providing heat transfer from a heat transfer medium to a ceiling, said contact element comprising:
   at least one guide for holding in heat-conducting contact a conduit through which a heat transfer medium flows; and
   a contact panel in heat-conducting connection with the at least one guide and having at least one contact surface, wherein the contact surface has a width to define lateral edges and includes at least one flat adhesive depression containing an adhesive means to provide an adhesive surface substantially flush with the contact surface, wherein the adhesive surface is spaced away from the lateral edges of the contact surface.

2. The contact element of claim 1, wherein the adhesive surface forms no more than 50% of the contact surface.

3. The contact element of claim 1, wherein the entire contact surface is located within 100 mm of the adhesive surface.

4. The contact element of claim 1, wherein the contact panel is elastically deformable.

5. The contact element of claim 1, wherein the adhesive surface is centrally located within the contact surface.

6. The contact element of claim 1, wherein the adhesive surface is a strip centrally located within the contact surface.

7. The contact element of claim 1, the adhesive depression extends for substantially the length of said contact surface.

8. The contact element according to claim 1, wherein the width of the contact surface is at least 70 mm.

9. The contact element of claim 1, wherein the contact panel comprises at least two essentially rigid regions separated by at least one continuous bending groove parallel to the contact surface.

10. The contact element of claim 9, wherein each rigid region includes at least a portion of the adhesive depression.

11. The contact element of claim 1, wherein the guide includes at least one straight section, and wherein the contact panel includes a bending groove arranged parallel to the at least one straight section.

12. The contact element of claim 11, wherein the bending groove is located on a base of the at least one straight section of the guide.

13. The contact element of claim 1, wherein the contact panel is perforated.

* * * * *